(12) United States Patent
   Nakata

(10) Patent No.: US 8,736,877 B2
(45) Date of Patent: May 27, 2014

(54) PRINT SYSTEM, CLIENT, CONTROL METHOD, AND STORAGE MEDIUM

(75) Inventor: Hiroaki Nakata, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 181 days.

(21) Appl. No.: 13/202,161

(22) PCT Filed: Apr. 15, 2011

(86) PCT No.: PCT/JP2011/002227
   § 371 (c)(1),
   (2), (4) Date: Aug. 18, 2011

(87) PCT Pub. No.: WO2011/135793
   PCT Pub. Date: Nov. 3, 2011

(65) Prior Publication Data
   US 2011/0299126 A1   Dec. 8, 2011

(30) Foreign Application Priority Data
   Apr. 28, 2010   (JP) .................... 2010-104298

(51) Int. Cl.
   *G06F 15/00*   (2006.01)

(52) U.S. Cl.
   USPC ........................................ 358/1.15

(58) Field of Classification Search
   CPC .................. G06F 3/1296; H04N 1/32358
   USPC ...................................... 358/1.15
   See application file for complete search history.

(56) References Cited

U.S. PATENT DOCUMENTS

| 2004/0212821 A1 | 10/2004 | Kimura |
| 2010/0195143 A1* | 8/2010 | Kanemitsu ................ 358/1.15 |
| 2013/0050735 A1* | 2/2013 | Nuggehalli et al. ......... 358/1.13 |

FOREIGN PATENT DOCUMENTS

| EP | 1785903 A1 | 5/2007 |
| EP | 2104328 A1 | 9/2009 |
| EP | 2164000 A1 | 3/2010 |
| JP | 2000-181662 A | 6/2000 |
| JP | 2004-326458 A | 11/2004 |
| JP | 2005-301748 A | 10/2005 |
| JP | 2006-023965 A | 1/2006 |
| JP | 2007-287149 A | 11/2007 |
| JP | 2007-328639 A | 12/2007 |
| KR | 10-2009-0100271 A | 9/2009 |

\* cited by examiner

*Primary Examiner* — Saeid Ebrahimi Dehkordy
(74) *Attorney, Agent, or Firm* — Canon USA, Inc. IP Division

(57) ABSTRACT

To decrease workloads caused by printing from a Web application and to provide a method for eliminating limitations of computers that can be used, a Web browser accesses a print management server based on an address transmitted from a Web application server in response to a print instruction, receives a print setting screen of an image forming apparatus that prints document data from a print management server, and displays the print setting screen.

7 Claims, 18 Drawing Sheets

```
                                901
<object
 id="print-function"
 type="remote-connection"
 src="http://printbar.com/main.aspx?data=http://documentshoo.com/data/111222333xps">
</object>
```

Fig. 15

UserA

| Printer | IsDefault | Settings |
|---|---|---|
| Boo Color Printer 1 | TRUE | ... |
| Foo B/W Printer 2 | FALSE | ... |
| Woo Color Printer 3 | FALSE | ... |
| | | |
| | | |

UserB

| Printer | IsDefault | Settings |
|---|---|---|
| Boo Color Printer 1 | FALSE | ... |
| Foo B/W Printer 2 | FALSE | ... |
| Woo Color Printer 3 | TRUE | ... |
| | | |
| | | |

⋮

UserA

| JobName | Printer | SubmitTime | Status |
|---|---|---|---|
| AA.doc | Boo Color Printer 1 | 2011/5/1 14:00 | Printing |
| BB.txt | Boo Color Printer 1 | 2011/5/1 13:00 | Printed |
| CC.cad | Woo Color Printer 3 | 2011/5/1 12:00 | Printed |
| | | | |
| | | | |

UserB

| JobName | Printer | SubmitTime | Status |
|---|---|---|---|
| DD.cpp | Woo Color Printer 3 | 2011/4/20 10:00 | Printed |
| EE.txt | Woo Color Printer 3 | 2011/4/20 09:00 | Printed |
| | | | |
| | | | |
| | | | |

⋮

PRINT SYSTEM, CLIENT, CONTROL METHOD, AND STORAGE MEDIUM

TECHNICAL FIELD

The present invention relates to a print system, a client, a control method, and a program for printing a document created by an application.

BACKGROUND ART

In recent years, World Wide Web (Web) applications operating on a Web browser have been researched and developed. The Web application can be used over a network via the Web browser without installing a program in a computer, which is to be a client. Patent Literature (PTL) 1 discusses the Web application described above.

The Web application has been developed along with the spread of the "cloud computing technique" for providing via the network IT services that have been conventionally provided by being incorporated in each client personal computer (PC). Along with the spread of the cloud computing technique, functions and usability of the Web application have become similar to those of document management software and spreadsheet software of incorporation type that need to be installed. Such kinds of Web applications are expected to become more popular in the future.

To print document data created by the current Web application, printing is performed as follows. Upon receiving input of a print instruction from a user, the Web application converts the document data into a printable data in the portable document format (PDF) and transmits the converted data to the client via the network. The Web browser on the client receives the transmitted PDF data, and then notifies the user of reception of the data. Upon receiving the notification, the user activates the PDF program to open and read the PDF data.

Along with more print instructions input by the user, the PDF program transmits a drawing instruction to a printer driver. The printer driver converts the drawing instruction into the page description language (PDL) format that a printer can interpret, and then transmits the converted data to the printer as a print job.

CITATION LIST

Patent Literature

PTL 1: Japanese Patent application Laid-Open No. 2006-23965

SUMMARY OF INVENTION

Technical Problem

However, printing functions of the document provided by the current Web applications have problems described below compared with the conventional applications of the incorporation type.

To print the document created by the current Web application, the user needs to previously install the PDF program or/and the printer drive into the client. However, the user who uses the Web application that features no necessity of being previously installed into the client may feel that installing the PDF program or the printer driver is a troublesome work.

Further, as another problem, it is supposed that the Web application is used from, for example, an inexpensive mobile computer (net-book) in which a free operating system (OS) such as Linux is incorporated. Since a wide variety of Linuxes are provided, it is highly likely that the printer driver corresponding to each Linux is not available. When the user uses the print function of the Web application using such a net-book, the user may not be able to print the data created by the Web application.

Thus, one of purposes of the present invention is to provide the print system for solving at least one problem of the aforementioned problems.

Solution to Problem

According to an aspect of the present invention, a print system including a print management server, a Web application server, a client, and an image forming apparatus includes an address transmission unit, included by the Web application server, configured to transmit both of a first address indicating an address of the print management server and a second address indicating an address of a storage location of document data stored in the Web application server, a Web browser, included by the client, configured to refer to the first address transmitted by the address transmission unit, receive information about a print setting screen corresponding to the image forming apparatus from the print management server, and display the print setting screen based on the received information, a transmission unit, included by the client, configured to transmit the second address transmitted by the address transmission unit to the print management server;

an acquisition unit, included by the print management server, configured to acquire print setting information input via the print setting screen displayed by the Web browser and the document data received from the Web application server based on the second address transmitted by the transmission unit;

a creation unit, included by the print management server, configured to create print data based on the print setting information and the document data acquired by the acquisition unit, and a print unit, included by the image forming apparatus, configured to receive the print data created by the creation unit from the print management server and print the received print data.

Advantageous Effects of Invention

According to an exemplary embodiment of the present invention, document data created by a Web application can be printed more easily than ever.

Further features and aspects of the present invention will become apparent from the following detailed description of exemplary embodiments with reference to the attached drawings.

BRIEF DESCRIPTION OF DRAWINGS

FIG. 15 is a schematic diagram illustrating a structure of user setting data.

DESCRIPTION OF EMBODIMENTS

Various exemplary embodiments, features, and aspects of the invention will be described in detail below with reference to the drawings.

EXAMPLE 1

Terms used in the present exemplary embodiment will be described first. Data, which a client 1 described below acquires from an external apparatus such as a Web application server 2 or a print management server 3, is referred to as "Web content". Further, data, which the print management server 3 acquires from the Web application server 2, is also referred to as the "Web content" in the present exemplary embodiment. As described above, the data, which a specific apparatus acquires from another apparatus connected via a network, is defined as the "Web content". Furthermore, the Web content includes a PDF for example, in addition to a hyper text markup language (HTML) document.

Figure 1:
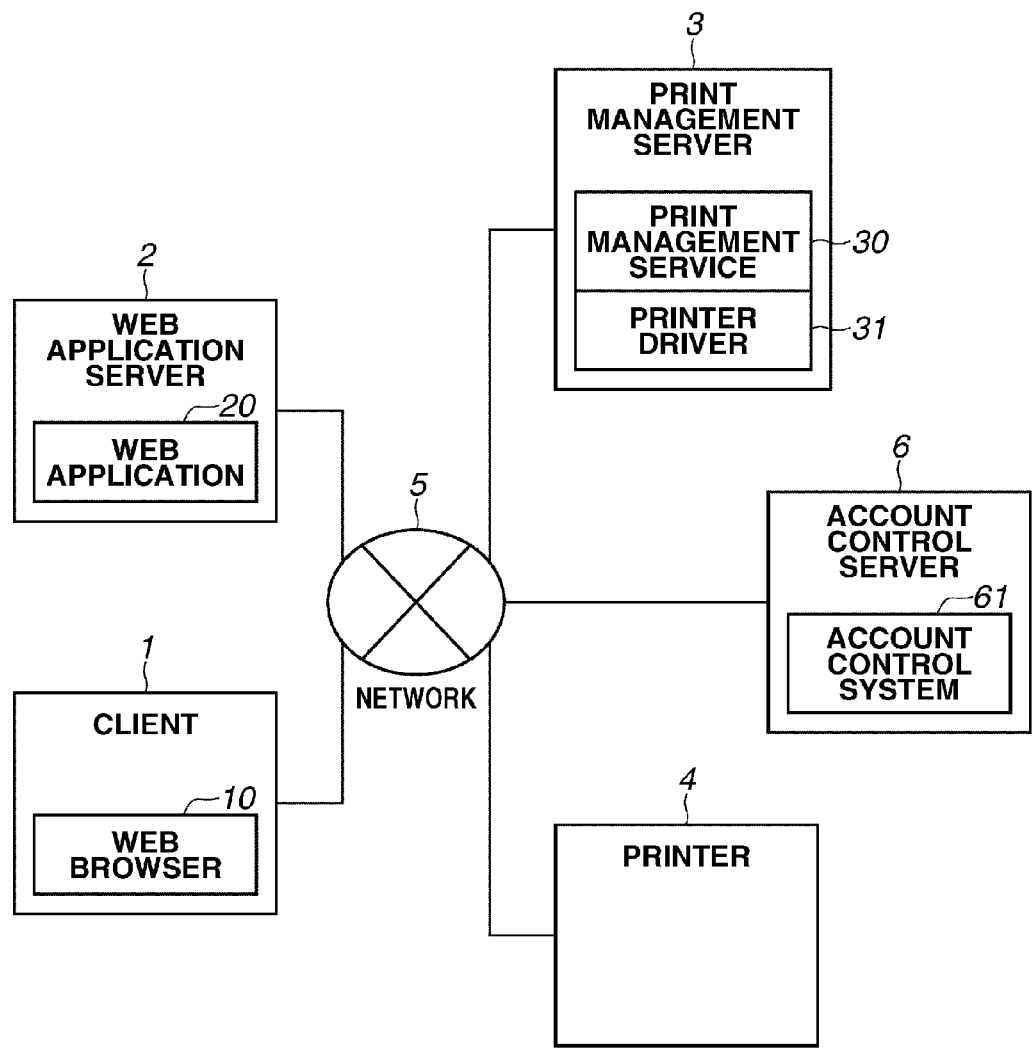
FIG. 1 is a block diagram illustrating an entire configuration of a system according to an exemplary embodiment of the present invention.

<FIG. 1: System Entire Configuration>

FIG. 1 illustrates a configuration of a print system for printing the Web content according to the present exemplary embodiment. The client 1 is a computer directly operated by a user, and connected to a network 5 via a network interface. In the present exemplary embodiment, only one client 1 is included, however, a plurality of clients may be included. Further, the network 5 may be the Internet including public lines or an intranet limited to a company local area network (LAN). With this arrangement, the apparatuses connected with each other via the network 5 can communicate with each other.

A Web browser 10 is an application for browsing the Web content and installed in the OS of the client 1. The Web application server 2 is a server computer also connected to the network 5. A Web application 20 is a network program that is stored in a memory of the Web application server 2, and operates on the OS of the Web application server 2. The user accesses the Web application server 2 connected to the network 5 via an operation screen displayed by the Web browser 10.

The Web browser 10, based on screen information (e.g., an HTML document) transmitted by the Web application server 2, displays an operation screen of the Web application 20. The user uses the Web application 20 via the operation screen. The print management server 3 is a server computer also connected to the network 5.

A print management service 30 is a network program that is stored in a memory of the print management server 3, and operates on the OS of the print management server 3. A printer 4 is an image forming apparatus and also connected to the network 5. In the present exemplary embodiment, only one printer is included, however, a plurality of printer may be included.

A printer driver 31 is a print program corresponding to the printer 4 and installed in the OS on the print management server 3. The Web application 20 can provide the user with the function for printing using the printer 4 by working together with the print management service 30. Details will be described below. From the user, since the print function seems to be a part of the functions provided by the Web application 20, the user is not conscious about existence of the print management service 30.

Figure 2:
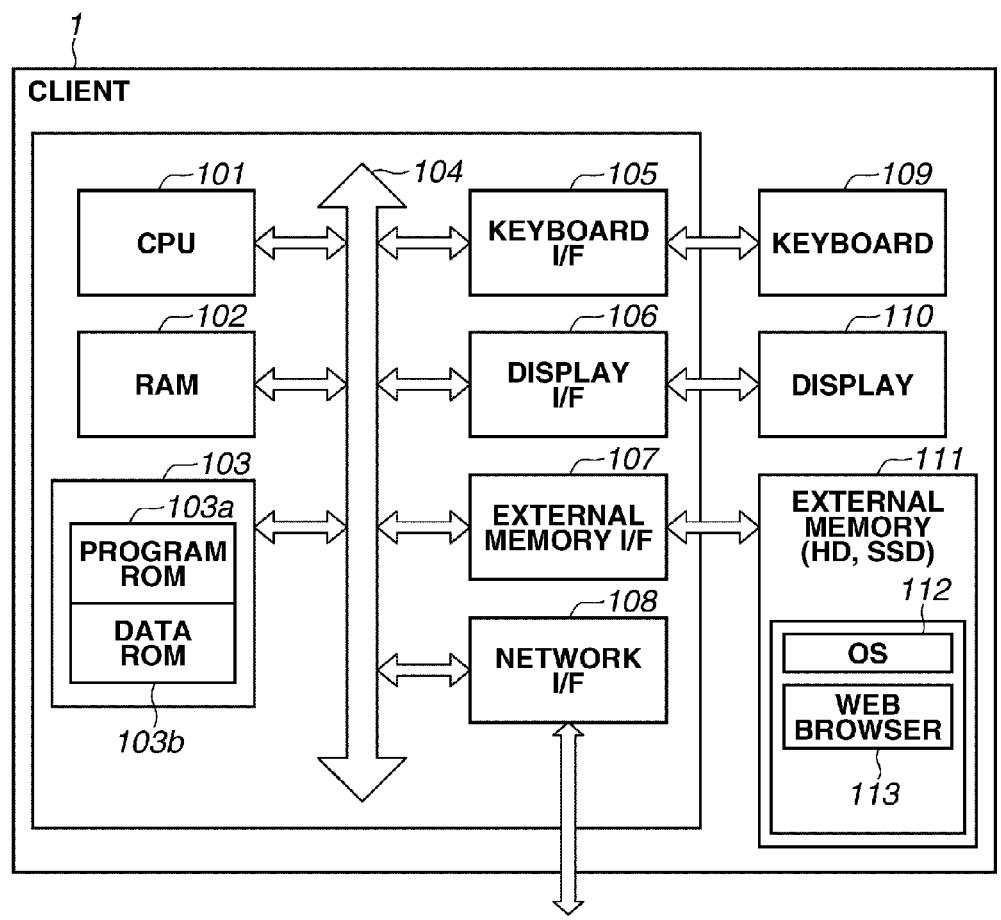
FIG. 2 is a block diagram illustrating a hardware configuration of a client.

<FIG. 2: Configuration of Computer Hardware>

FIG. 2 is a block diagram illustrating an internal system of the client 1, which is a general computer apparatus. In the client 1, a central processing unit (CPU) 101 comprehensively controls each device connected to a system bus 104 according to a program stored in a random access memory (RAM) 102. The RAM 102 functions also as a main memory and a work area for the CPU 101.

A read only memory (ROM) 103 is separated into a ROM 103a for storing a boot program and a basic input/output system (BIOS) and a ROM 103b for storing various data. A keyboard controller interface (I/F) 105 controls key input from a keyboard 109 and a pointing device (mouse) (not illustrated). A display I/F 106 controls display on a display 110. An external memory I/F 107 controls access to an external memory 111 such as a hard disk (HD) and a solid state disk (SSD).

The external memory 111 functions as a storage memory that stores the OS 112, application programs such as the Web browser 10, and further user files and an edition files (not illustrated). A network I/F 108 is connected to the network 5, and performs communication control processing.

Although the Web application server 2 and the print management server 3 included in the print system of the present exemplary embodiment are server apparatuses, they have an apparatus configuration similar to that of the client 1. As described with reference to FIG. 1, the programs operating on the client 1, the Web application server 2, and the print management server 3 are different from one another. Further, the programs operating on the client 1, the Web application server 2, and the print management server 3 are loaded into the RAM 102, and executed by the CPU 101 to realize the functions corresponding to each program. Each function to be realized will be described below.

Figure 3:
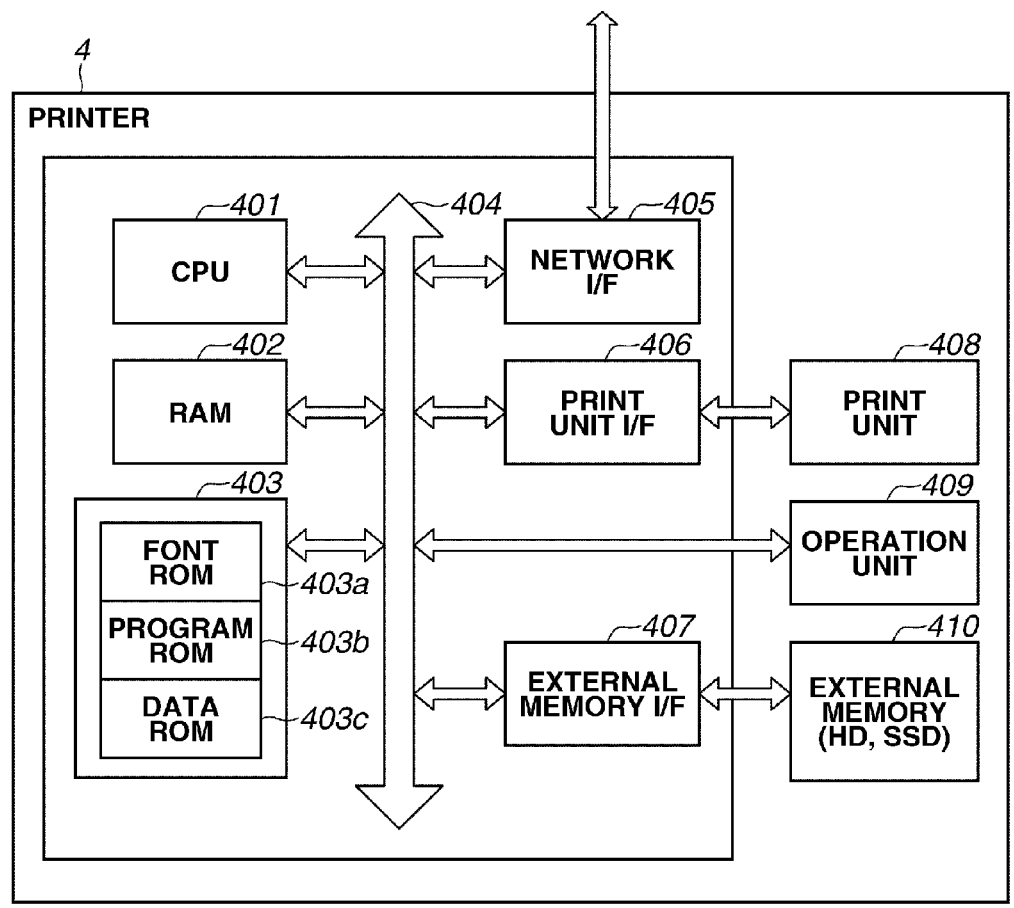
FIG. 3 is a block diagram illustrating a hardware configuration of a printer.

<FIG. 3: Configuration of Printer Hardware>

FIG. 3 is a block diagram illustrating an internal system of the printer 4. A CPU 401 controls an entire operation of the printer 4. A RAM 402 functions as a main memory and a work area for the CPU 401, and further is used as an output information expansion region and an environmental data storage region.

Furthermore, the RAM 402 includes a non-volatile RAM (NVRAM) region. Moreover, the RAM 402 can expand a memory capacity with an option RAM connected to an expansion port (not illustrated). A ROM 403 includes a font ROM 403a for storing various kinds of fonts, a program ROM 403*b* for storing a control program executed by the CPU 401, and a data ROM 403*c* storing various data.

A network I/F 405 is connected to the network 5 and performs the communication control processing. A print unit I/F 406 controls an interface with a print unit 408, which is a printer engine. An access of an external memory 410 is controlled by an external memory I/F 407. Further, the external memory 410 includes a hard disk (HD) connected thereto as an option and stores font data, an emulation program, and form data.

An operation unit 409 includes an operation panel for receiving an operation from the user. On the operation panel, switches for operations and a light emitting diode (LED) display device are disposed (not illustrated). Based on the control program stored in the program ROM 403*b* of the ROM 403, the CPU 401 outputs an image signal as output information to the print unit 408 via the print unit I/F 406.

Figure 4:
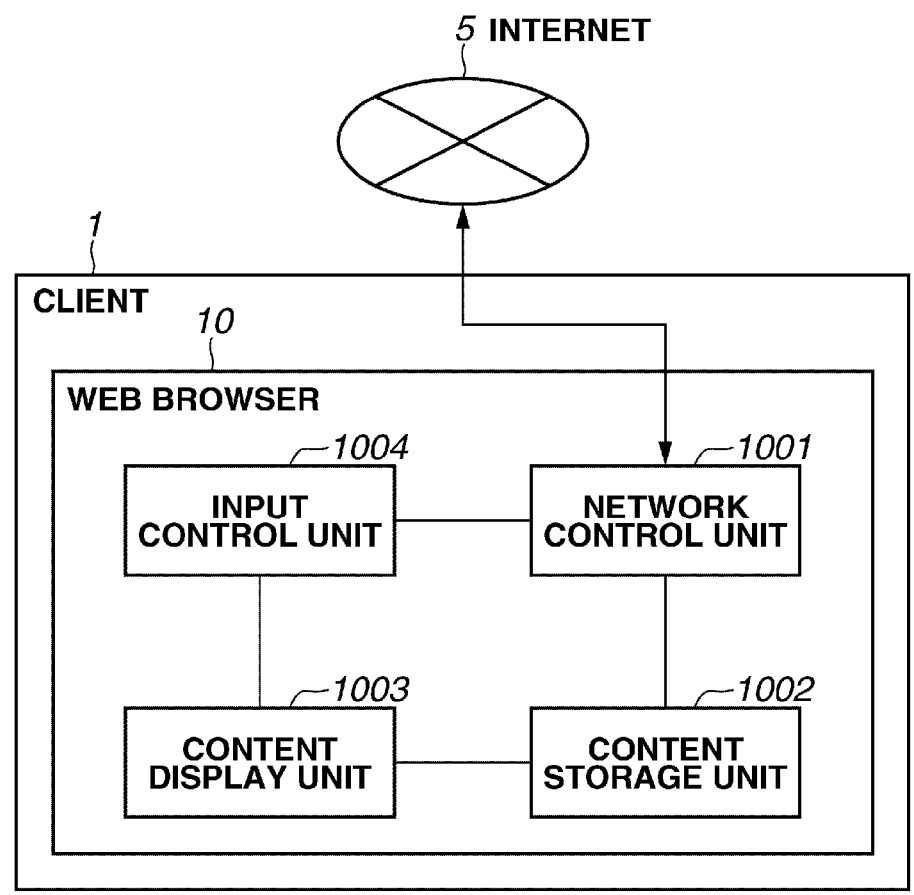
FIG. 4 is a block diagram illustrating an internal system of a Web browser.

<FIG. 4: Configuration of Internal System of Web Browser>

FIG. 4 is a block diagram illustrating an internal system of the Web browser 10. The Web browser 10 operates as a user application on the OS of the client 1.

A communication control unit 1001, which is an internal component of the Web browser 10, communicates with the external apparatus connected to the network 5 via the network I/F 108, and performs processing for receiving the Web content and processing for transmitting input data from the user. A content storage unit 1002 stores the Web content acquired by the communication control unit 1001 into the RAM 102 or the external memory 111, and further provides the Web content according to a request from other component.

A content display unit 1003 takes out the Web content stored on the content storage unit 1002, interprets descriptions of an HTML document, a style sheet language, and image data, and then performs processing for display the interpreted descriptions on the display 110. Further, the content display unit 1003, when a style sheet is specified for the Web content, adopts the style sheet thereto and displays the Web content.

An input control unit 1004 detects input via a menu command of the Web browser 10, or a link or a button displayed on the display 110 as a part of the Web content, and performs processing corresponding to the input. For example, when a mouse cursor is placed over an underlined character string in the displayed Web contents, which is a link, the input control unit 1004 gives an instruction to the content display unit 1003 to display the character string of the link in highlighted colors.

Further, when the user clicks the link, the input control unit 1004 gives an instruction to the communication control unit 1001 to acquire the Web content indicated by the link.

The Web browser 10 included in the print system of the present exemplary embodiment does not need a component controlling the print processing, and the OS 112 does not need a print related program such as a printer driver either. Thus, the client 1 can be constituted by the Web browser including no print function, or an inexpensive client terminal (e.g., net-book) including the OS (e.g., Linux) having no available printer driver.

Figure 5:
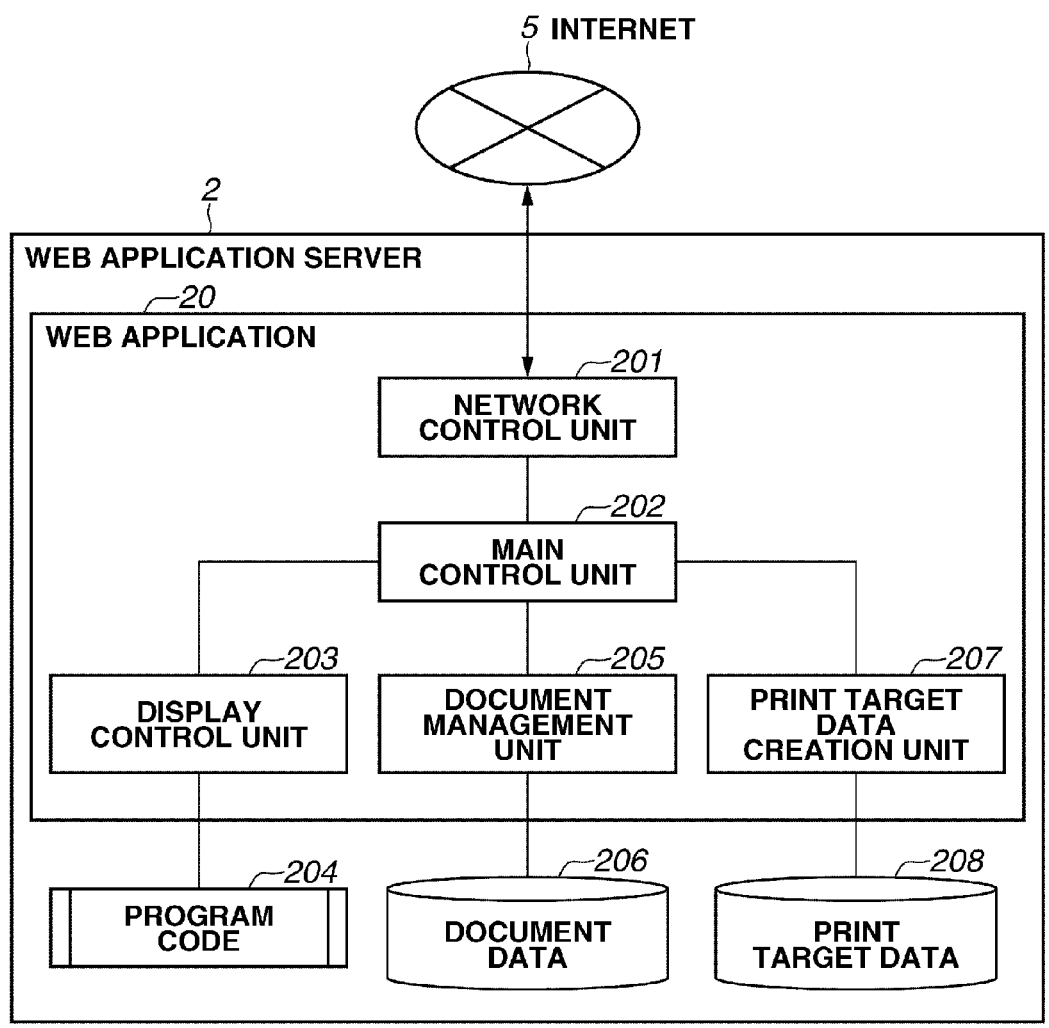
FIG. 5 is a block diagram illustrating an internal system of a Web application.

<FIG. 5: Configuration of Internal System of Web Application>

FIG. 5 is a block diagram illustrating an internal configuration of the Web application 20 on the Web application server 2. The Web application 20 is an application for creating a document. Firstly, a communication control unit 201 receives a request (instructions for activating, operating, or ending the Web application) transmitted by the Web browser 10. The communication control unit 201 performs control for transferring the received request to a main control unit 202 and transmitting a response from the main control unit 202 to the Web browser 10.

The main control unit 202 processes the request transmitted from the communication control unit 201, and gives an instruction for processing to a display control unit 203, a document management unit 205, and a print target data creation unit 207 that are sub components. The display control unit 203 reads a stored program code 204 to create the Web content (in this case, screen information such as HTML) corresponding to the UI displayed on the Web browser, and then transmits the Web content to the main control unit 202. Further, the display control unit 203 processes the request for an input operation transmitted from the main control unit 202, and creates the UI corresponding to the request thereof.

A document management unit 205 performs control for storing the document data 206 created by the user in the external memory of the Web application server 20 and further reading document data therefrom. While the conventional application of the incorporation type stores the document data on the user's computer, the Web application features storing the document data on the server.

A print target data creation unit 207 converts the document data 206 into print target data 208 in a format appropriate for printing in response to a print instruction request from the user. The print target data 208 includes, for example, the extensible markup language paper specification (XPS) and the PDF.

Figure 6:
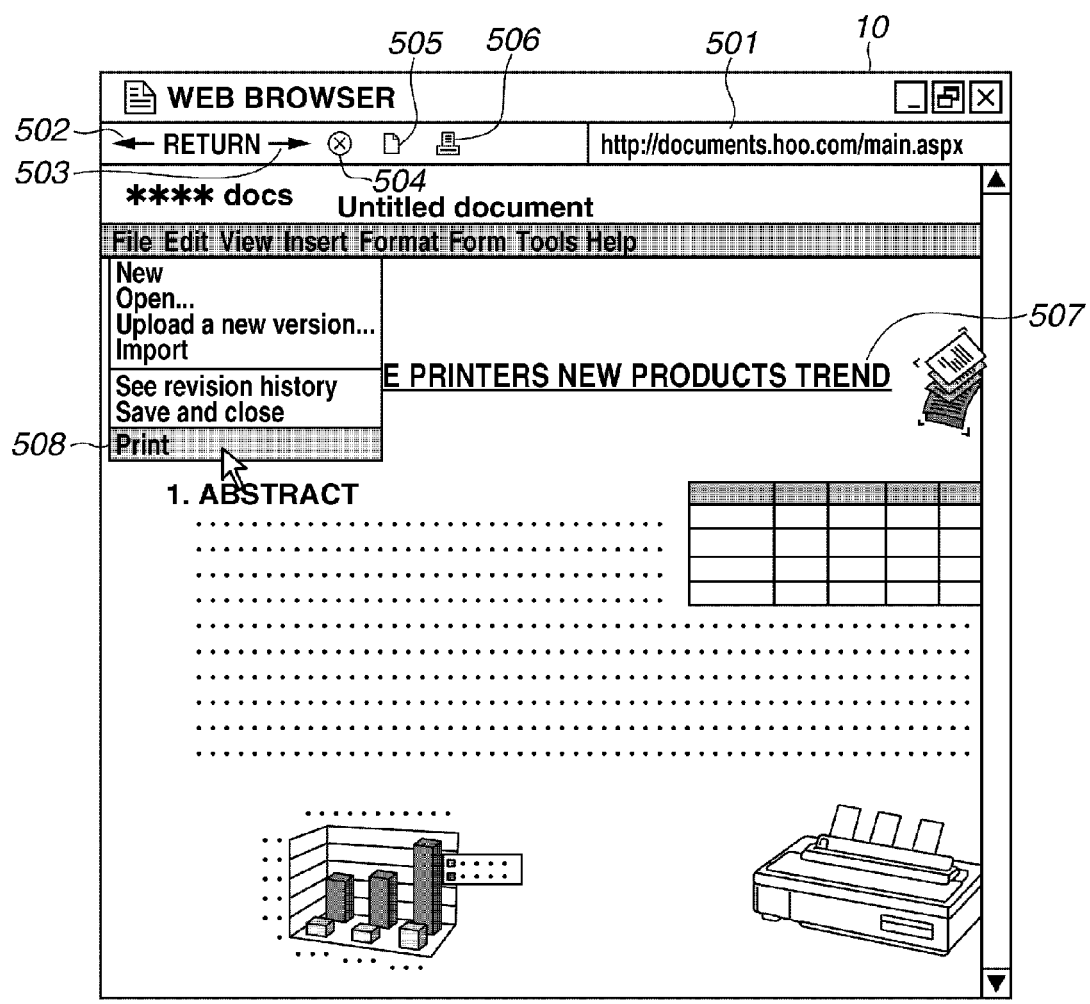
FIG. 6 illustrates a user interface (UI) of a Web application.

<FIG. 6: UI of Web Application>

FIG. 6 illustrates the UI of the Web application 20 activated on the Web browser 10 via the network 5. A uniform resource locator (URL) box 501 displays the URL included in the Web browser 10 incorporated in the client 1. When the user input the URL of the Web application 20 into the URL box 501, the Web browser 10 transmits an activation request of the Web application 20 to the Web application server 2.

The Web application 20 that has received the activation request transmits the UI created by the display control unit 203 as a response to the Web browser 10. The Web browser 10 receives the UI as the Web content, and the content display unit 1003 processes the Web content and displays the Web content in a display region 507 of the Web browser 10.

At this point, a document edition screen displayed in the display region 507 is preferably designed not similarly to an appearance of the conventional Web page but that of a screen of a conventional document creation application of an incorporation type. With this, although the document edition screen is provided by the Web application, the appearance thereof is very similar to that of the application of an incorporation type. Thus, the user can acquire the usability similar to the application of an incorporation type that has conventionally existed.

Menu buttons 502, 503, 504, 505, and 506 are provided for the user to use functions such as "Return", "Proceed", "Cancel", and "Print", which are generally provided by the Web browser.

Particularly, it is emphasized not to use the menu button of "Print" for activating the print function provided by the Web browser. That is because, since the print function generally provided by the Web browser is used to perform printing in a layout optimized for display on the display screen, printing on paper with the print function of the Web browser causes the layout to collapse.

An example will be described. For example, the document data including a plurality of pages created by the Web application is printed with the print function of the Web browser. Since the Web browser arranges the layout without considering separation of pages, the user cannot acquire the output as expected. According to the present exemplary embodiment, it is not the Web browser 10 but a print menu 508 provided by the Web application 20 and to be used by the user to print the document data.

Upon receiving a print instruction from the user via the print menu 508, the Web application 20 creates the print target data 208 having the optimum layout for outputting onto recording paper using the print target data creation unit 207. Thus, the user can acquire the output in a desired format. However, to print the created print target data 208, the user needs to previously install the application or/and the printer driver for reading the print target data 208.

Figure 7:
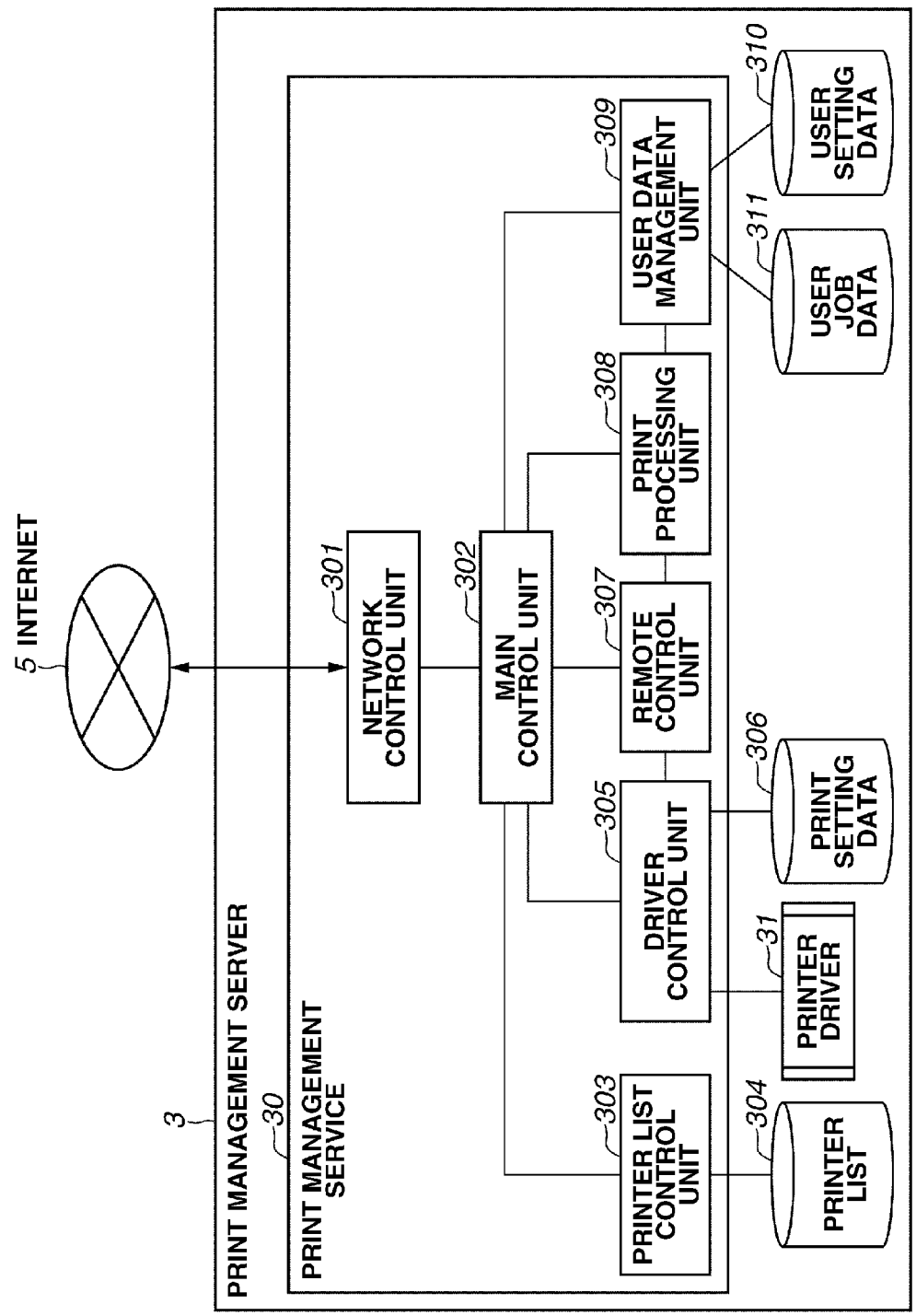
FIG. 7 is a block diagram illustrating an internal system of a print management service.

<FIG. 7: Configuration of Internal System of Print Management Service>

To solve the aforementioned problem, it is the print management service 30 on the print management server 3 that provides the user with the function for printing the document data 206 created by the Web application 20 from the outside of the client 1. FIG. 7 is a block diagram illustrating an internal system of the print management service 30.

Firstly, a communication control unit 301 performs communication control with the Web application 20 and the printer 4. A main control unit 302 processes the request transferred from the communication control unit 301, and gives the instruction for processing to each sub component. A printer list control unit 303 manages a list of available printers and controls the UI to be selected by the user.

A printer list 304 is a database of the printer list managed by the printer list control unit 303. A driver control unit 305 displays the UI of the printer driver 31 on the print management server 3. The UI displayed on the print management server 3 is remotely displayed on the client 1 by a remote control unit 307 and controlled so that the user can operate the UI.

Print setting information set by a remote operation via the UI is stored by the driver control unit 305 as print setting data 306. A print processing unit 308 performs processing for creating a print job from the print target data 208 and the print setting data 306. A user data management unit 309 performs processing for managing user setting data 310 and user job data 311.

Figures 8, 9:
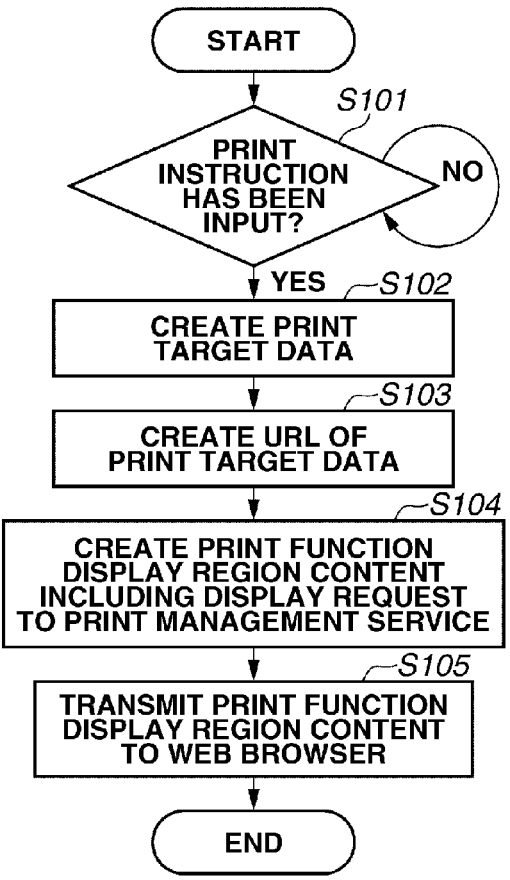
FIG. 8 is a flowchart illustrating processing performed by a Web application.
FIG. 9 illustrates print function display region content.

<FIG. 8: Flowchart of Processing Performed by Web Application>

<FIG. 9: Example of Print Function Display Region Content>

FIG. 8 is a flowchart illustrating processing performed by the Web application 20. In step S101, the main control unit 202 firstly determines whether the client 1 inputs the print instruction. As described above, the instruction for printing the document created by the Web application 20 is given by selecting the print menu 508 displayed on the Web browser 10.

An operation selected by the user with the print menu 508 is transferred to the Web application server 2 via the input control unit 1004, the communication control unit 1001, and the network 5. Further, the operation is transferred to the communication control unit 201 and the main control unit 202 of the Web application 20, and then the main control unit 202 performs processing corresponding to the operation. The main control unit 202 returns a response for the processing back in an opposite way to present the response to the user.

When the main control unit 202 determines that the user inputs the print instruction (YES in step S101), then, in step S102, the print target data creation unit 207 creates the print target data 208. Original data for creating the print target data 208 is the document data 206 stored by the document management unit 205.

Next, in step S103, the main control unit 202 creates a URL indicating a storage location of the print target data 208 so that the print management server 3 can access via the network 5 the print target data 208 created in step S102. In other words, the print target data 208 stored as the data on the RAM 102 is copied to an appropriate address of the external memory 111 recognized as the Web content from the outside, and the URL indicating the Web content of the print target data 208 is created.

As an example, the URL of the print target data 208 that becomes the Web content in step S103 is defined as http://documents.hoo.com/data/111222333.xps. The main control unit 202 may limit access according to a network address of an access source so that other users cannot surreptitiously browse the Web content indicated by the URL described above.

Next, in step S104, the main control unit 202 creates the print function display region content including a display request for the print management service 30. FIG. 9 illustrates a print function display region content 901. The print function display region content 901 is description that is a part of the HTML document to be transmitted as a screen of the Web application to the client 1. The print function display region content 901 is described according to a grammar rule of the HTML document and includes one <object/>element and its attribute. The <object/>element indicates information about the Web content to be displayed in a part of the Web browser 10 using a plug-in that is a sub program of the Web browser.

An id attribute indicates an identifier of the element. This identifier is referred to in cascading style sheets (CSS) in which the layout of the HTML document is described. The CSS can specify a display position and a display size of the Web content (i.e., <object/>element) specified by the identifier. Based on the information indicated by the id attribute, the display position and the display size of the Web content to be displayed in a part of the Web browser 10 is determined.

A type attribute indicates a type of the Web content displayed in a part of the Web browser 10. The type attribute of "remote-connection" indicates that the content is the Web content displayed using the remote desktop technique for displaying and operating the UI of another computer via the network.

Using the remote desktop technique, the Web browser 10 displays the UI of another computer as the Web content displayed in a part of the Web browser 10. An src attribute indicates the URL of the Web content displayed in a part of the Web browser 10. In the present exemplary embodiment, the URL of the print management service 30 is specified as a value of the src attribute.

A first address of "http://print.bar.com/main.aspx" that is a front half portion of the URL indicates a program location information of the print management service 30 in the network 5. A second address of "data=http://documents.hoo.com/data/111222333.xps" that is behind "?" indicates a parameter to be transferred to the print management service 30.

The parameter value of "http://documents.hoo.com/data/111222333.xps" is the URL of the print target data 208 created in step S103. As described above, the URL of the print target data 208 is transmitted to the print management service 30 as the parameter to enable the print management service 30 to access the print target data 208. Details will be described below.

In step S105, the main control unit 202 transmits the Web content of the UI including the created print function display region content 901 to the Web browser 10 via the communication control unit 201. This transmission is realized by an address transmission unit (network I/F 108) of the Web application server 2.

As described above, the print function display region content 901 includes both addresses of the print management server 3 and a storage location of the document data created using the Web application stored in the Web application server 2. The print function display region content has been described thus far.

Figure 10:
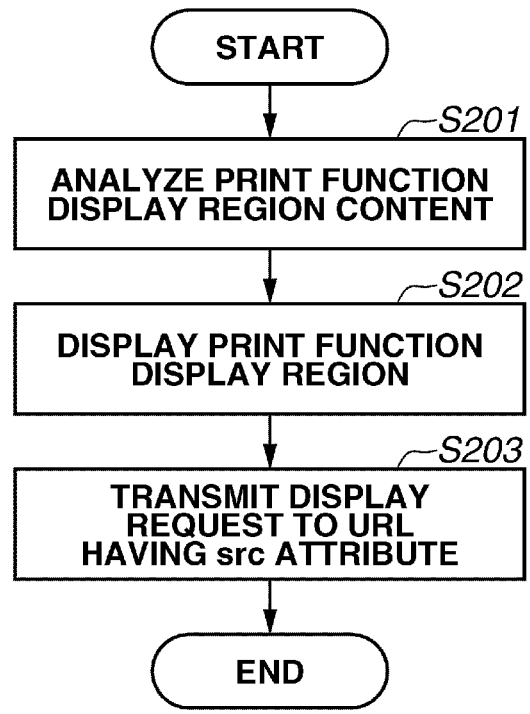
FIG. 10 is a flowchart illustrating processing performed by a Web browser.

<FIG. 10: Flowchart of Processing Performed by Web Browser>

Figure 12A:
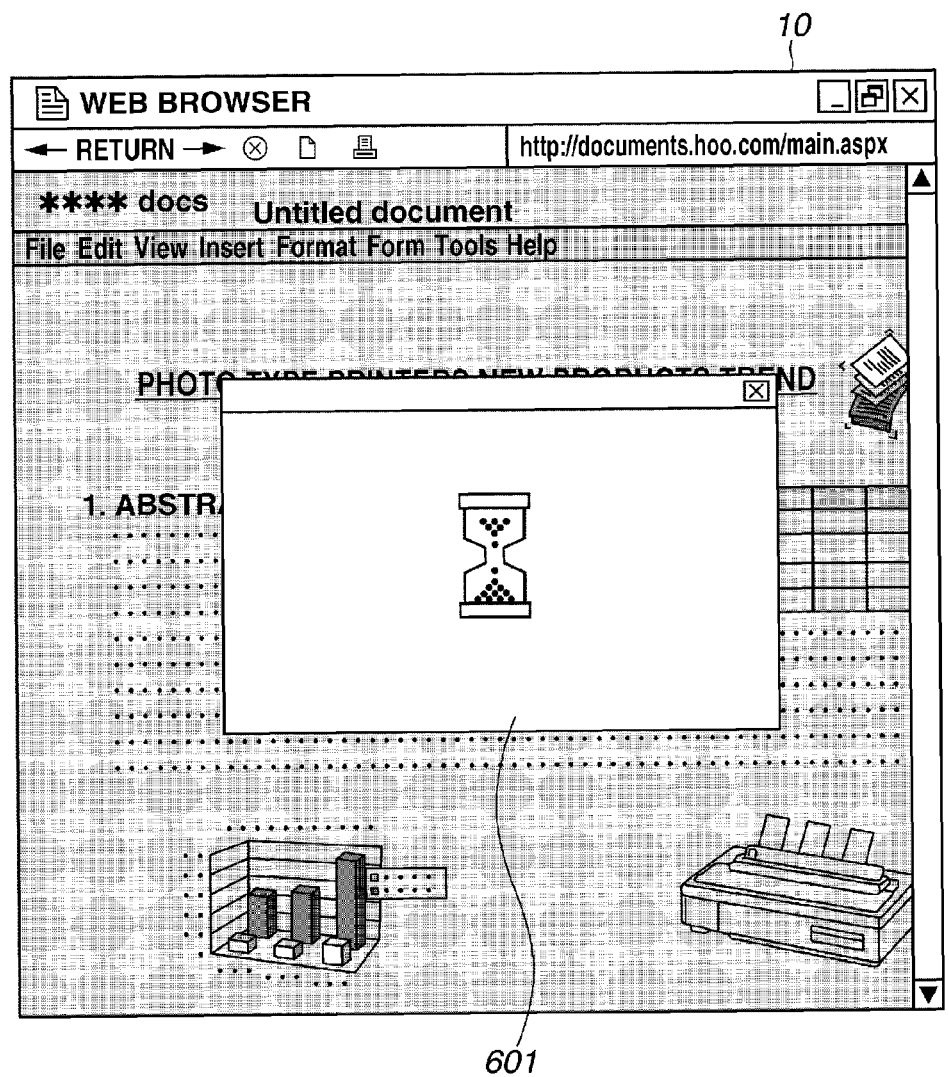
FIG. 12A illustrates a UI in a print function display region.

<FIG. 12A: Example of UI in Print Function Display Region>

FIG. 10 is a flowchart illustrating processing performed by the Web browser 10. Firstly, upon receiving the Web content including the print function display region content 901 transmitted from the Web application 20 in step S105, in step S201, the content display unit 1003 analyzes the received Web content. The Web content described herein is the screen information (e.g., HTML document) of the operation screen of the Web application 20 and the CSS describing the layout of the operation screen.

Next, in step S202, the content display unit 1003 displays the UI of the Web application 20 as a result of analysis. FIG. 12A illustrates the UI displayed as the result of the step S202. A print function display region 601 is displayed based on the analysis result of the print function display region content 901.

A screen configuration of FIG. 12A is specified by the CSS in such a manner that the display region 507 in a document edition screen is displayed in grayout as a background and the print function display region 601, which is a foreground, is disposed at a center of the screen. With this configuration, the screen illustrated in FIG. 12A is realized to appear as if a modal dialog were opened with the application of an incorporation type.

As of step S202, since the Web browser 10 has not yet acquired the print function content to be displayed inside the print function display region 601, nothing is displayed therein. To notify the user that the display inside the print function display region 601 is being processed, as illustrated in FIG. 12A, a sand clock icon may be displayed.

The sand clock icon may be displayed as a standby screen set for the Web browser 10 as the default or the screen information transmitted from the Web application server 2. Next, in step S203, the content display unit 1003 accesses the URL indicated by the src attribute included in the print function display region content 901 analyzed in step S202 to transmit to the print management service 30 the display request for displaying the print function inside the print function display region 601.

Figure 11:
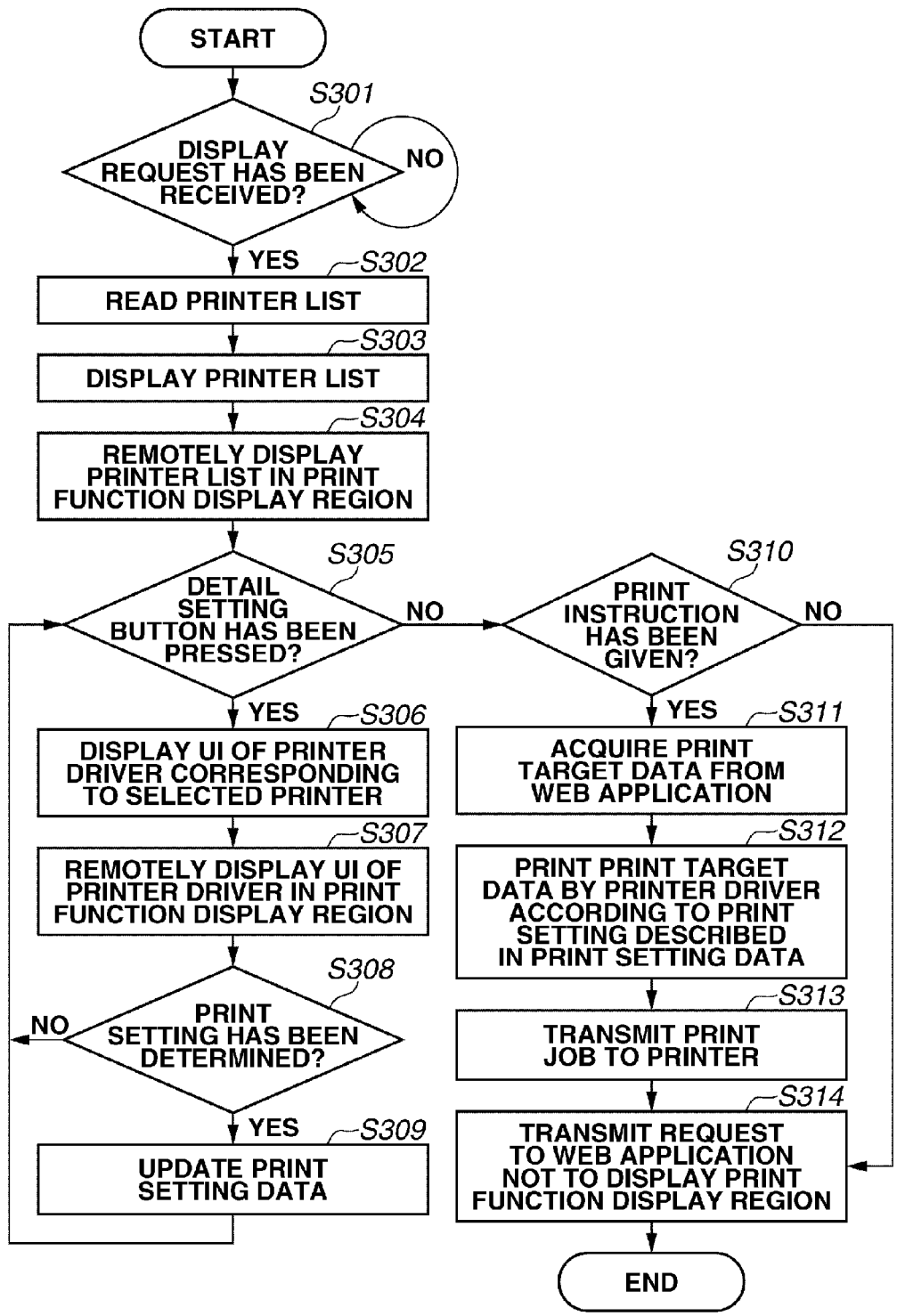
FIG. 11 is a flowchart illustrating processing performed by a print management service.

<FIG. 11: Flowchart of Processing Performed by Print Management Service>

Figure 12B:
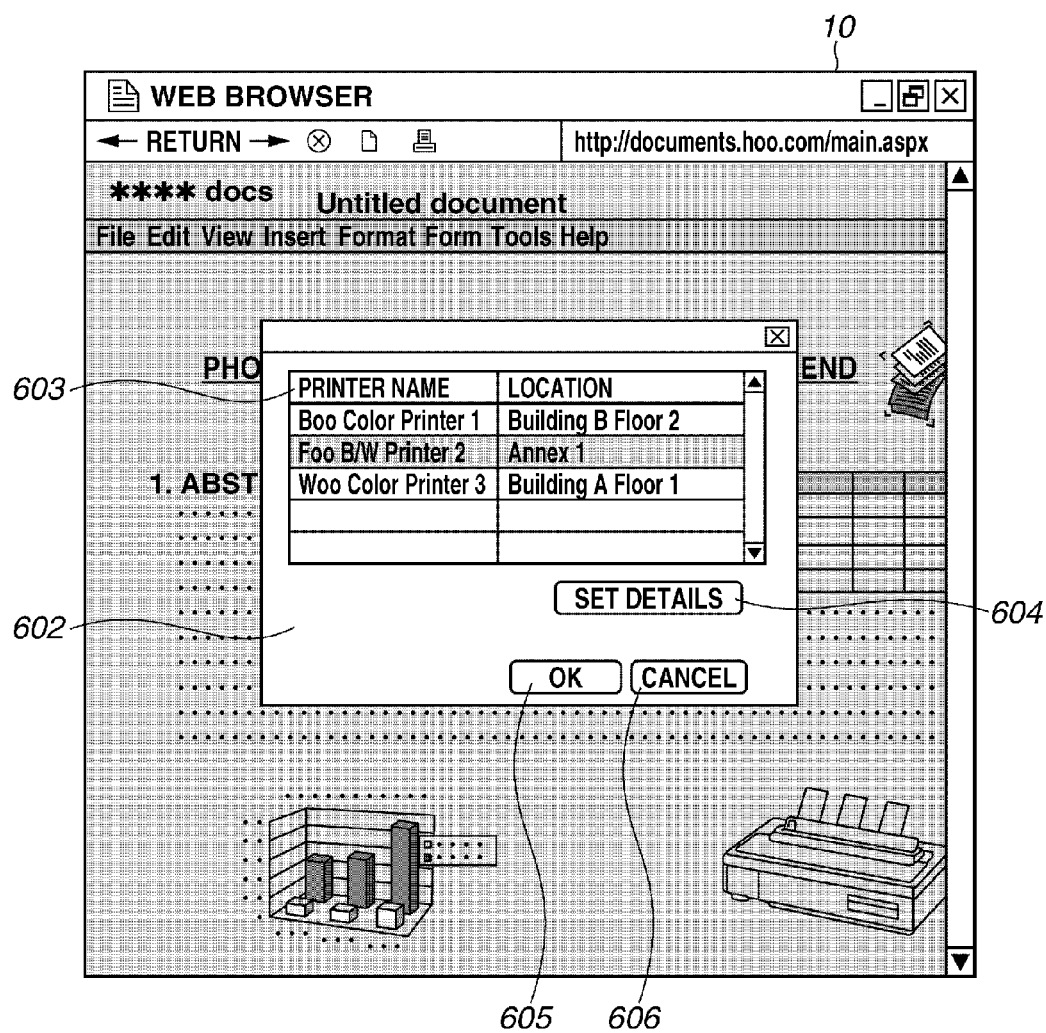
FIG. 12B illustrates a UI for a printer list.

<FIG. 12B: Example of UI For Printer List>
<FIG. 12C: Example of UI For Printer Driver>

FIG. 11 is a flowchart illustrating processing performed by the print management service 30. In step S301, upon receiving the display request transmitted via the communication control unit 301 in step S203, the processing proceeds to step S302. As described above, the display request received in step S301 also includes the parameter to be transferred to the print management service 30. Next, in step S302, upon receiving the instruction from the main control unit 302, the printer list control unit 303 reads the printer list 304.

The printer list 304 is a database of the printers that can perform printing with the print system described herein and holds information about each printer such as a printer name, an installation location, and a network address. The printer list of the present exemplary embodiment is a list of printers which the user of the client 1 can use. However, content of the printer list is not limited to the specific content.

Next, in step S303, based on the information in the read printer list, the printer list control unit 303 displays on the print management server 3 the UI for selecting the printer to be used. In step S304, the remote control unit 307 remotely displays the UI of the printer list inside the print function display region 601. Remotely displaying means, using the remote desktop technique, transferring the UI displayed on the print management server 3 to the print function display region 601 on the client 1 via the network 5 to display the UI in the print function display region 601 so that the UI can be operated via the client 1.

FIG. 12B illustrates a screen 602 of the printer list displayed as s result of step S304. A list control 603 displays information in the printer list, and the user can select one printer to be used via the Web browser 10.

A detail setting button 604 is a menu for performing print setting for the selected printer. An OK button 605 is a menu for giving the print instruction, and a cancel button 606 is a menu for giving a print cancel instruction.

A point to be noted herein is that the display region 507 of the document data is displayed by the Web application 20, and the screen 602 of the printer list is displayed by the Web content transmitted from the print management service 30.

The Web application 20 displays the print function display region 601 as a place holder, and whole display processing of the print function included in the place holder is transferred to the print management service 30.

Further, the information indicating that the user has performed input operation inside (herein, a screen 602 of the printer list) the print function display region 601 is naturally not transmitted to the Web application 20 but to the print management service 30. That is because the screen of the print function display region 601 is transmitted by the print management service 30 and the information is input using the screen.

In step S305, when the user inputs the selection operation using a detail setting button 604 (YES in step S305), the remote control unit 307 advances the processing to step S306, and when the user does not input the selection operation thereof (NO in step S305), the processing proceeds to step S308.

In step S306, upon receiving the instruction from the main control unit 302, the driver control unit 305 opens the UI of the printer driver corresponding to the printer selected by the list control 603. According to the present exemplary embodiment, the printer 4 is selected as a printer and the printer driver corresponding thereto is the printer driver 31.

Figure 12C:
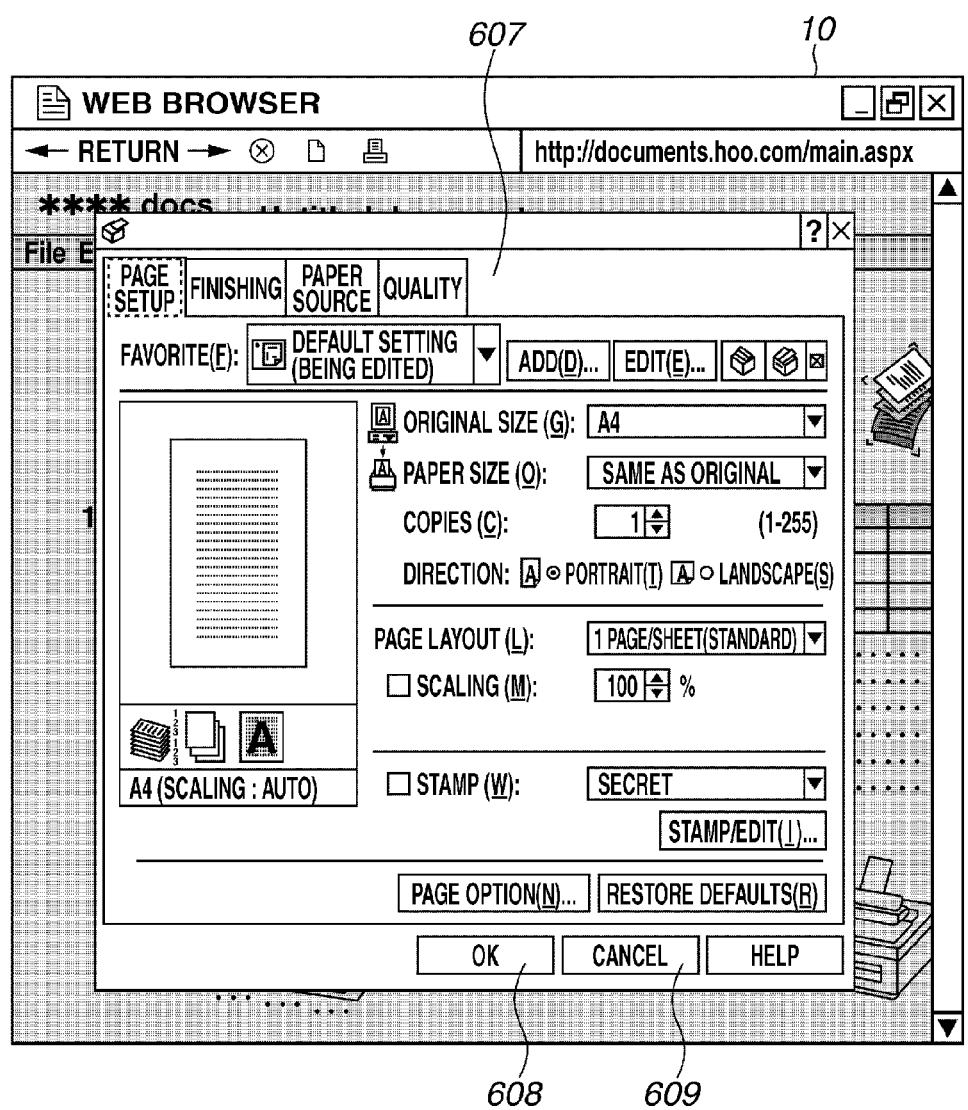
FIG. 12C illustrates a UI for a printer driver.

In step S307, the remote control unit 307 remotely displays the UI of the printer driver 31 inside the print function display region 601. As a result of step S307, as illustrated in FIG. 12C, the display content in the print function display region 601 is switched from the screen 602 of the printer list to a user I/F 607, which is a UI of the printer driver.

In the user I/F 607, various kinds of print setting (e.g., paper size, stapler, color matching) specialized for the printer 4 can be input. The user I/F 607 is a print setting screen. An OK button 608 is a menu for defining the input print setting, and a cancel button 609 is a menu for discarding the input print setting.

In step S308, when the OK button 608 is pressed to define the print setting (YES in step S308), the remote control unit 307 advances the processing to step S309. In step S308, when the cancel button 609 is pressed to discard the print setting (NO in step S308), the processing returns to step S305.

In step S309, the driver control unit 305 receives the information about the determined print setting from the printer driver 31 and updates the print setting data 306.

In step S310, when the printer for perform printing and the printer setting are determined and the OK button 605 on the screen 602 is pressed to give the print instruction (YES in step S310), the remote control unit 307 advances the processing to step S311. When the print instruction is given via the Web browser 10, the print instruction is transmitted to the print management server 3 via the communication control unit 1001 and the network I/F 108. On the other hand, when the cancel button 606 is pressed (No in step S310), it is determined that the print cancel instruction is given, and the processing proceeds to step S314.

The main control unit 302 accesses the URL of "data=http://documents.hoo.com/data/111222333.xps" specified by the display request received in step S301. In step S311, the main control unit 302 acquires the print target data 208 from the Web application 20.

In step S312, upon receiving the instruction from the main control unit 302, the print processing unit 308 requests the printer driver 31 to perform printing of the acquired print target data 208 using the print setting of the print setting data 306 to create the print data. The print execution processing performed in step S312 is realized by an existing technique such as the graphic device interface (GDI) print or the XPS print. When step S309 is not performed, in other words, when the user gives the print instruction without inputting the print setting to be determined, the print processing unit 308 performs printing using the default print setting of the printer driver 31.

In step S313, the main control unit 302 transmits the print job created as the result of the printing execution in step S309 to the printer 4. Upon receiving the print job, the printer 4 performs printing and outputting.

In S314, the main control unit 302 transmits the request to the Web application 20 not to display the print function display region 601. Upon receiving the request of step S314, the Web application 20 stops displaying the print function display region 601 and in turn displays the document edition screen as the foreground in the display region 507. With this arrangement, the user can understand that the operation of the print function ends and gets back to the normal operation of the edition function. As described above, the processing of the Web browser 10, the Web application 20, and the print management service 30 have been described thus far.

Every time the Web browser 10 accesses the Web application 20 (i.e., for each session), the Web application 20 activates a process of an independent application. Thus, a plurality of users can simultaneously use the printer from one client, and also a plurality of users can simultaneously use the printer from a plurality of clients. Accordingly, since the processing of the print system of the present invention is performed independently for one session, a plurality of users can simultaneously use the print system.

Furthermore, since the print system of the present invention is performed independently for one session, the print system can be simultaneously used by a plurality of Web applications. Furthermore, as described in steps S302, S303, and S304, the print system of the present invention can manage a plurality of printers. When the printer that can perform outputting is newly added, information about the printer is added to the printer list 304, and the printer driver corresponding to the newly added printer is installed on the print management server 3.

EXAMPLE 2

Figure 13:
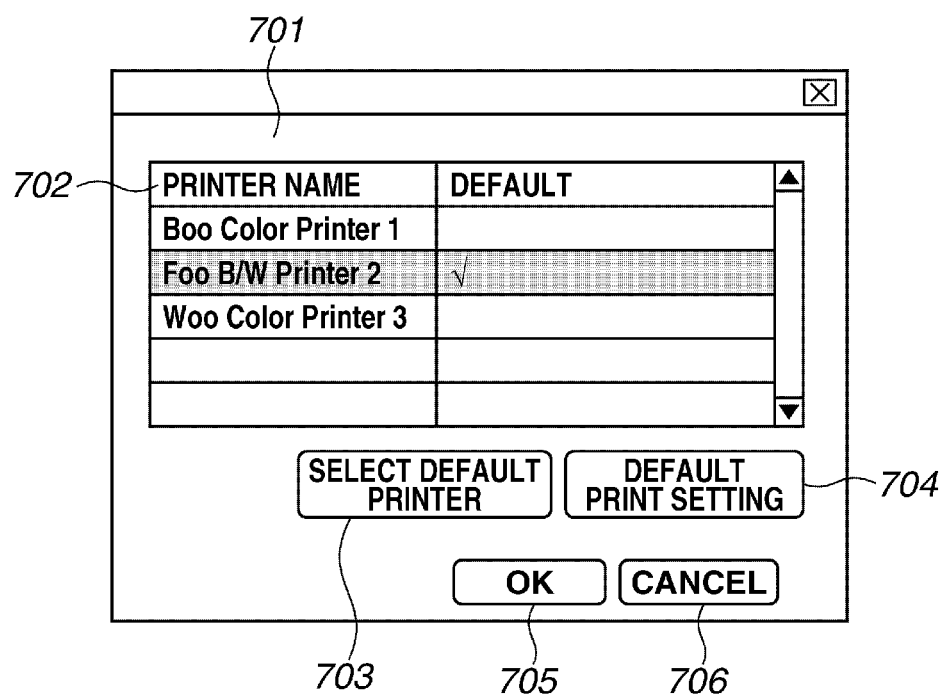
FIG. 13 illustrates a UI for a default setting management screen.

<FIG. 13: Example of IF of Default Setting Management Screen>
<FIG. 14: Flowchart of Management Processing of Default Printer and Default Print Setting>
<FIG. 15: Schematic Diagram Illustrating Structure of User Setting Data>

In the first exemplary embodiment, the processing has been described for selecting the printer for outputting, performing the print setting, and performing printing via the Web application. However, the first exemplary embodiment does not describe usage cases where the printer usually used for printing is previously set and the default print setting of the printer is previously specified. Thus, in a second exemplary embodiment, processing for specifying a default output destination for each user and the print setting will be described.

As a premise for performing setting for each user, the Web application 20 and the print management service 30 can work together with an account control system 61 on the print management server 3. The user performs login processing with the account control system 61 before accessing the Web application 20 and the print management service 30 so that information about the user using the system is transmitted.

Under such an account control system, the user data management unit 309 of the print management service 30 manages the user setting data 310 including information about setting for each user.

FIG. 13 illustrates an example of a UI of a default setting management screen 701. The user accesses the print management service 30 via the Web browser 10, and then the default setting management screen 701 is distributed and displayed as the Web content. As described above, since the user accesses the print management service 30 after performing the login processing, the information to be displayed and set via the default setting management screen 701 has been customized for each user.

A printer list 702 displays a list of printers that can perform outputting and provides information about the printer name and whether to be the default printer. A default printer button 703 is a menu for setting the printer selected in the printer list 702 as the default printer. A default print setting button 704 is a menu for performing the default print setting on the selected printer. An OK button 705 is a menu for determining the setting and a cancel button 706 is a menu for cancelling the setting.

Figure 14:
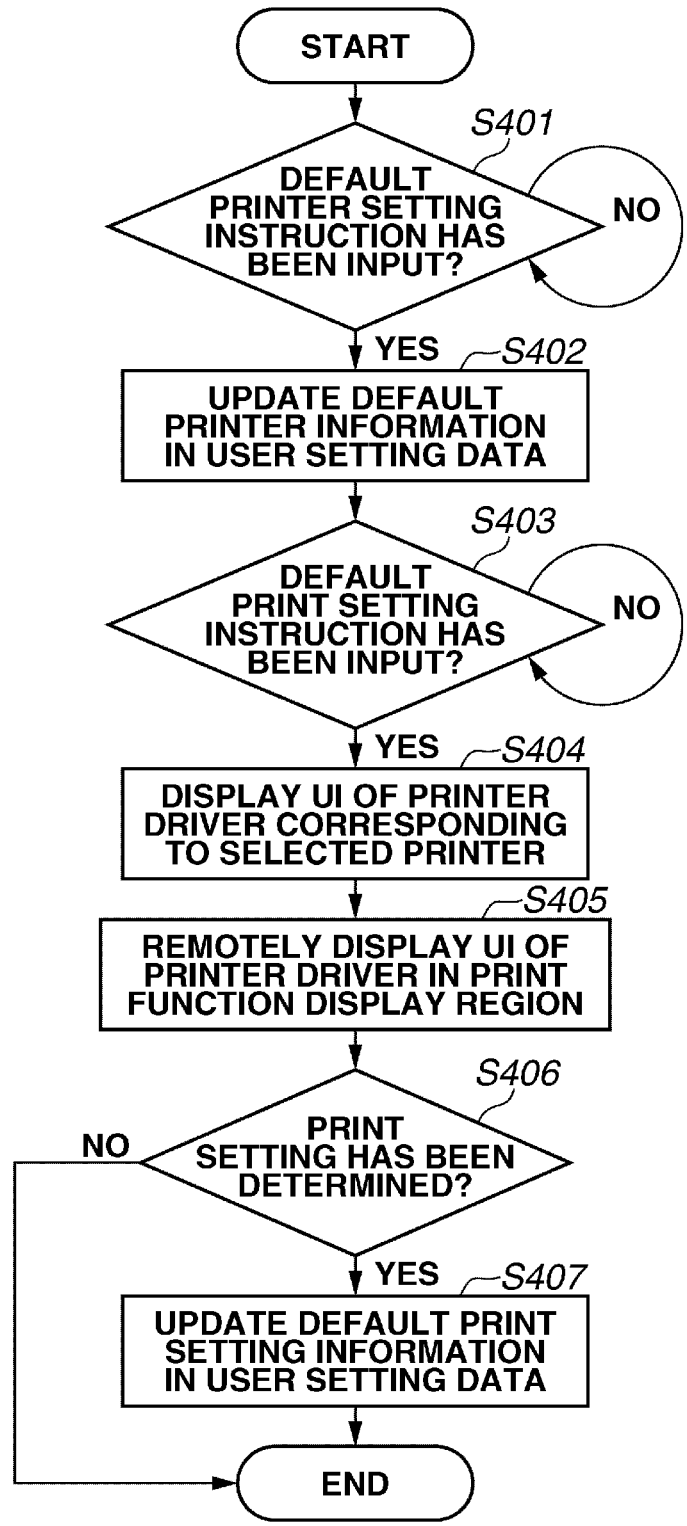
FIG. 14 is a flowchart illustrating management processing performed on default printers and default print setting.

FIG. 14 is a flowchart illustrating processing performed in the second exemplary embodiment. In step S401, when the main control unit 302 receives the default printer setting instruction input via the default setting management screen 701 displayed on the Web browser 10 via the communication control unit 301 (YES in step S401), the processing proceeds to step S402. The default printer instruction is transmitted from the Web browser by pressing the default printer button 703. Since the default printer setting instruction includes the information about the printer name selected as the default in the printer list 702, in step S402, the information is written into the user setting data 310 and stored therein.

FIG. 15 is a schematic diagram illustrating a data structure of the user setting data 310. As described above, the user setting data 310 is managed for each user, for example User A and User B, and includes the information about the default print setting and whether each printer is the default printer.

Next, in step S403, when the main control unit 302 receives the default print setting instruction input via the communication control unit 301 (YES in step S403), the processing proceeds to step S404. The default print setting instruction is transmitted from the Web browser by pressing the default print setting button 704.

In step S404, the main control unit 302 causes the driver control unit 305 to open the UI of the driver corresponding to the printer specified by the default print setting instruction and then causes the remote control unit 307 to display the UI on the Web browser 10. In step S406, the user inputs the print setting (e.g., two-sided printing, monochrome printing) of the default via the displayed UI of the driver such as the user I/F 607 illustrated in FIG. 12C, and presses the OK button 608 to determine the setting. When the user presses the cancel button 609, the processing ends.

Since, when the print setting is determined, the print setting data is created by the driver, in step S407, the information indicating the default print setting of the specified printer in the user setting data 310 is updated and stored. As described above, the setting for each user stored by the processing in steps S401, S402, S403, S404, S405, S406, and S407 is used when the Web application 20 performs the print processing to increase the usability for the users.

When reading and displaying the printer list including the output destinations in steps S303 and S304, the Web application 20 reads the user setting data 310 and places a cursor in advance to the printer specified as the default. With this arrangement, the user does not have to select the printer which the user normally uses for each time.

Further, when opening and displaying the UI of the driver in steps S306 and S307, the Web application 20 reads the user setting data 310, specifies the stored print setting of the default as an initial value, and opens the UI. With this arrangement, the user does not have to input the setting such as two-sided printing and monochrome printing that has been previously input for each time.

EXAMPLE 3

In the first example, the print management service 30 transmits the print job to the printer 4 after the user gives the print instruction, however, whether the printer 4 actually outputs the job, and the method for knowing the information about the job that has been printed in the past are not described. Thus, in a third exemplary embodiment, a method will be described in which the user acquires a procedure of the print job of this system and the information about history.

Figure 16:
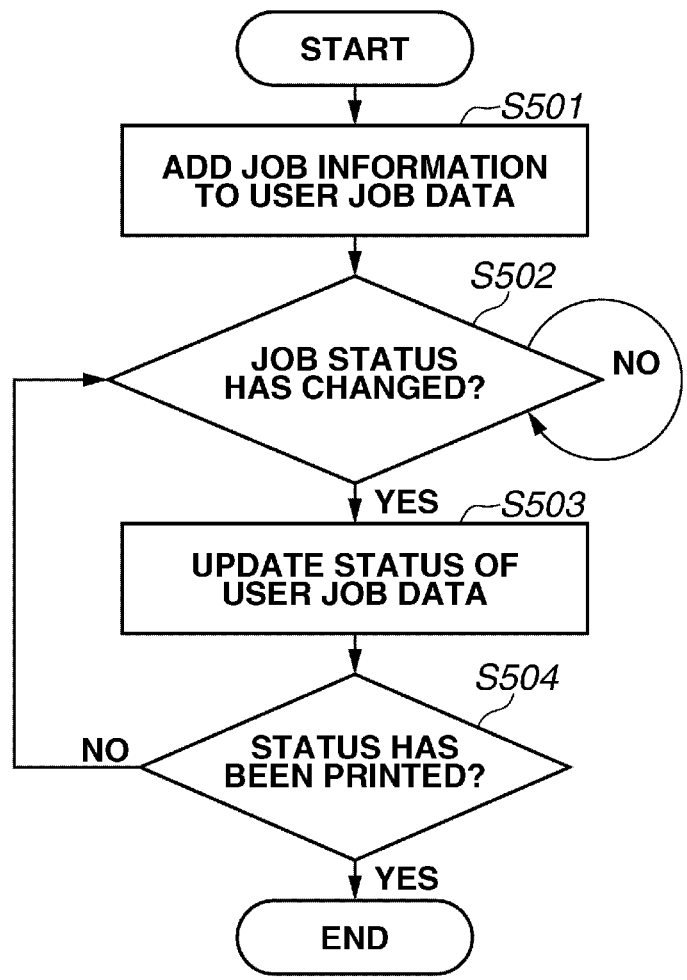
FIG. 16 is a flowchart illustrating management processing performed on user job data.

<FIG. 16: Flowchart of Management Processing of User Job Data>

Figures 17, 18:
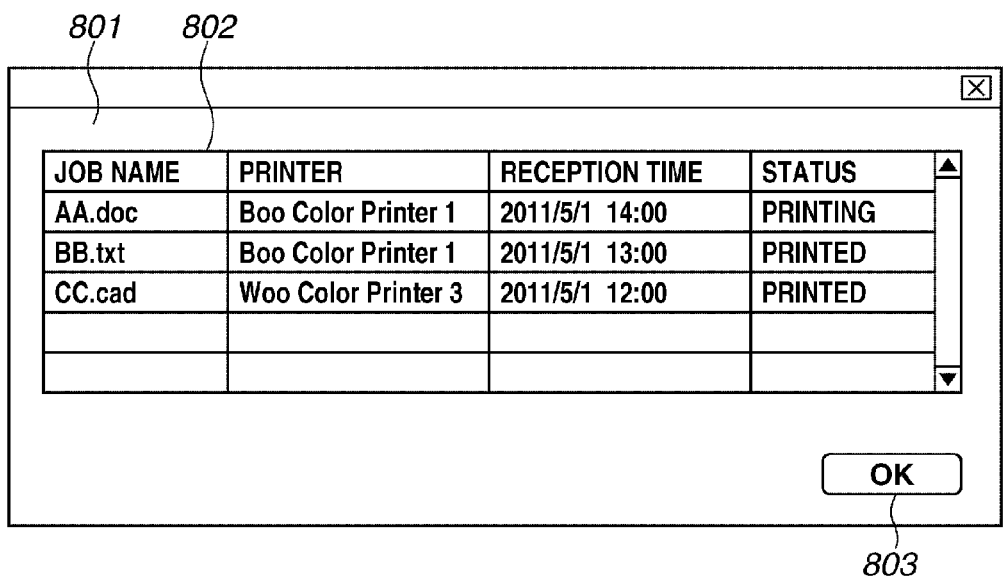
FIG. 17 is a schematic diagram illustrating a configuration of user job data.
FIG. 18 illustrates a UI on a job list screen.

<FIG. 17: Schematic Diagram Illustrating Structure of User Job Data>

<FIG. 18: Example of User IF on Job List Screen>

FIG. 16 is a flowchart illustrating processing performed in a third exemplary embodiment. Firstly, in step S501, upon receiving the print instruction from the user and starting the print processing, the print processing unit 308 adds the information about the job that has started to be printed, to the user job data 311 via the user data management unit 309. FIG. 17 is a schematic diagram illustrating the data structure of the user job data 311.

As with the user setting data 310, the information of the user job data 311 is also managed for each user. The information about the job to be managed for each user includes a job name, a printer of an output destination, a reception time of a job, and a status of a job. The same number of the jobs as that of information thereabout is stored.

In step S501, since the information about the job name, the printer, and the reception time is obvious, the print processing unit 308 specifies them. The status is updated by the processing described below and not specified herein.

In step S502, the print processing unit 308 acquires the status of the job on the print management server 3. The status of the job can be acquired via an application program interface (API) of the OS operating on the print management server 3. A method for acquiring the status every predetermined time may be adopted, or a method for receiving a notice from the OS only when the status changes, may be adopted.

When the status changes, in step S503, the print processing unit 308 updates the information about the status of the user job data 311. Values for the status include, for example, "Printing", "Suspending", "Reactivating", and "Printed". In step S504, the print processing unit 308 repeats acquiring the status and updating the information, and then, when the status becomes "Printed", the processing ends.

As described above, as a method for checking the state in which arbitrarily updating the procedure of the job and a history of the job having printed in the past, a job list screen 801 is prepared for the user. The user accesses the print management service 30 via the Web browser 10, and then the job list screen 801 is distributed and displayed as the Web content.

FIG. 18 illustrates an example of the UI for the job list screen 801. On a list 802, the information about the user's job is displayed. When an OK button 803 is pressed, the job list screen 801 can be closed. Via such a screen, the user can acquire the information about the job that is "Printing" or "Printed".

According to the exemplary embodiments, as illustrated in FIGS. 12A, 12B, and 12C, the print setting screen is displayed in a part of the operation screen of the Web browser, however, a method for displaying the print setting screen is not limited thereto.

For example, when a tab browser is adopted as the Web browser 10, the print setting screen may be displayed in another tab different from that of the operation screen. As the other example, another Web browser different from the Web browser 10 may be activated to display the print setting screen.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

This application claims priority from Japanese Patent Application No. 2010-104298 filed Apr. 28, 2010, which is hereby incorporated by reference herein in its entirety.

The invention claimed is:

1. A print system including a print management server, a Web application server, a client, and an image forming apparatus comprising:

an address transmission unit, included in the Web application server, configured to transmit a first address indicating an address of the print management server;

a Web browser, included in the client, configured to refer to the first address transmitted by the address transmission unit, receive information about a print setting screen corresponding to the image forming apparatus, and display the print setting screen based on the received information;

an acquisition unit, included in the print management server, configured to acquire print setting information input via the print setting screen displayed by the Web browser and the document data received from the Web application server;

a creation unit, included in the print management server, configured to create print data based on the print setting information and the document data acquired by the acquisition unit; and a print unit, included by the image forming apparatus, configured to receive the print data created by the creation unit from the print management server and print the received print data.

2. The print system according to claim 1, wherein, when the client gives a print instruction, the address transmission unit transmits an instruction for displaying a modal dialogue in addition to the first address, and wherein, in response to receiving the instruction for displaying the modal dialog, on an operation screen for operating a Web application held by the Web application server, the Web browser displays the modal dialogue, and, in response to receiving the print setting screen from the print management server, the Web browser displays the print setting screen on the modal dialog.

3. The print system according to claim 2, wherein, during a period from starting to display the modal dialogue until receiving the print setting screen from the print management server, the Web browser displays on the modal dialogue an icon for notifying a user that display is in process.

4. A client capable of communicating with a Web application server including a Web application and a print management server, the client comprising:

a Web browser configured to display an operation screen; and a transmission unit configured to transmit a print instruction of document data created by operating the Web application using the operation screen of the Web browser, to the Web application server, the document data being printed using a printer driver in the print management server, wherein the Web browser accesses the print management server based on an address transmitted from the Web application server in response to the print instruction transmitted by the transmission unit, receives a print setting screen of an image forming apparatus that prints the document data, and displays the received print setting screen.

5. A control method for controlling a client capable of communicating with a Web application server including a Web application and a print management server, the control method comprising:

displaying via a Web browser an operation screen; and transmitting to the Web application server a print instruction of document data created by operating the Web application using the operation screen of the Web browser, the document data being printed using a printer driver in the print management server, wherein the Web browser accesses the print management server based on an address transmitted from the Web application server in response to the print instruction transmitted by the transmission unit, receives a print setting screen for an image forming apparatus that prints the document data, and displays the received print setting screen.

6. A computer-readable non-transitory storage medium having a program of a Web browser that, when executed by a processor capable of communicating with a Web application server including a Web application and a print management server, causes the processor to perform operations comprising:

displaying an operation screen; and instructing the Web application server to print document data created by operating the Web application using the operation screen, the document data being printed using a printer driver in the print management server, wherein the Web browser accesses the print management server based on an address transmitted from the Web application server in response to the given print instruction, receives a print setting screen for an image forming apparatus that prints the document data, and displays the received print setting screen.

7. A method used in a print system including a print management server, a Web application server, a client, and an image forming apparatus, the method comprising:

transmitting a first address indicating an address of the print management server;

using a Web browser, included in the client, to refer to the first address transmitted, receive information about a print setting screen corresponding to the image forming apparatus, and display the print setting screen based on the received information;

acquiring print setting information input via the print setting screen and the document data received from the Web application server;

creating print data based on the print setting information and the acquired document data; and receiving the print data from the print management server and printing the received print data.

* * * * *